(12) United States Patent
Jin (10) Patent No.: US 12,056,359 B2
(45) Date of Patent: Aug. 6, 2024

(54) STORAGE DEVICE, ELECTRONIC DEVICE INCLUDING STORAGE DEVICE, AND OPERATING METHOD THEREOF

(71) Applicant: SK hynix Inc., Gyeonggi-do (KR)

(72) Inventor: Byoung Min Jin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/978,522

(22) Filed: Nov. 1, 2022

(65) Prior Publication Data
US 2023/0384936 A1   Nov. 30, 2023

(30) Foreign Application Priority Data

May 25, 2022   (KR) .......................... 10-2022-0064263

(51) Int. Cl.
*G06F 3/06*   (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41;
(Continued)

(56) References Cited

U.S. PATENT DOCUMENTS 6,792,483 B2 *   9/2004   Schmidt ................ G06F 3/0659
                                                              710/48
8,046,764 B2 *  10/2011   Yamakabe ............ G06F 9/5072
                                                              718/104
(Continued)

OTHER PUBLICATIONS

J. Zhu, L. Wang, L. Xiao, L. Liu and G. Qin, "EBIO: An Efficient Block I/O Stack for NVMe SSDs With Mixed Workloads," in IEEE Transactions on Computer-Aided Design of Integrated Circuits and Systems, vol. 42, No. 12, pp. 5048-5060, Dec. 2023, doi: 10.1109/TCAD.2023.3296369. (Year: 2023).*

(Continued)

*Primary Examiner* — Daniel C. Chappell
(74) *Attorney, Agent, or Firm* — IP & T GROUP LLP (57) ABSTRACT

Provided herein may be a storage device, an electronic device including the storage device, and an operating method thereof. The storage device may include a memory controller, the memory controller including a plurality of functions configured to be identified as a plurality of storage devices logically separated from each other by an external host, a resource manager configured to store characteristic values and resource values respectively corresponding to the plurality of functions, and a command processor configured to, when commands respectively corresponding to the plurality of functions are received from the external host, preferentially process a command corresponding to a first function having lowest resource value, among the plurality of functions, based on the resource values, and update a resource value of the first function by accumulating an characteristic value of the first function in the resource value of the first function.

18 Claims, 7 Drawing Sheets

(58) Field of Classification Search
CPC ......... G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 8,296,480 | B2* | 10/2012 | Noeldner | G06F 12/00 710/33 |
| 8,332,849 | B2* | 12/2012 | Solomon | G06F 9/546 718/1 |
| 8,418,166 | B2* | 4/2013 | Armstrong | G06F 9/45558 717/168 |
| 10,169,948 | B2* | 1/2019 | Fluman | G06Q 20/0855 |
| 10,534,546 | B2* | 1/2020 | Benisty | G06F 3/0679 |
| 11,055,022 | B2* | 7/2021 | Benisty | G06F 13/1642 |
| 11,061,713 | B2* | 7/2021 | Hutcheson | G06F 3/065 |
| 11,822,472 | B2* | 11/2023 | Ponnamaneni | G06F 3/0604 |
| 2005/0039183 | A1* | 2/2005 | Romero | G06F 9/5061 718/100 |
| 2010/0268816 | A1* | 10/2010 | Tarui | G06F 11/3409 718/1 |
| 2012/0180048 | A1* | 7/2012 | Brownlow | G06F 9/45558 718/1 |
| 2012/0272243 | A1* | 10/2012 | Nolterieke | G06F 9/5094 718/1 |
| 2016/0077959 | A1* | 3/2016 | Quach | G06F 12/0284 711/102 |
| 2021/0200568 | A1* | 7/2021 | Sharma | G06F 9/4881 |
| 2021/0200703 | A1* | 7/2021 | Simionescu | G06F 13/4295 |
| 2023/0384936 | A1* | 11/2023 | Jin | G06F 3/061 |

OTHER PUBLICATIONS

B. Yan, "Enabling Efficient Slab-based Allocator on Fast NVMe SSD," 2022 Asia Conference on Algorithms, Computing and Machine Learning (CACML), Hangzhou, China, 2022, pp. 361-366, doi: 10.1109/CACML55074.2022.00067. (Year: 2022).*

* cited by examiner

| Function 1 (RESOURCE VALUE: X) | Function 2 (RESOURCE VALUE: Y) | Function 3 (RESOURCE VALUE: Z) | Running Function |
|---|---|---|---|
| 0 | 0 | 0 | Function 1 |
| 60 | 0 | 0 | Function 2 |
| 60 | 100 | 0 | Function 3 |
| 60 | 100 | 150 | Function 1 |
| 120 | 100 | 150 | Function 2 |
| 120 | 200 | 150 | Function 1 |
| 180 | 200 | 150 | Function 3 |
| 180 | 200 | 300 | Function 1 |
| 240 | 200 | 300 | Function 2 |

STORAGE DEVICE, ELECTRONIC DEVICE INCLUDING STORAGE DEVICE, AND OPERATING METHOD THEREOF

CROSS-REFERENCE TO RELATED APPLICATION

The present application claims priority under 35 U.S.C. § 119(a) to Korean patent application number 10-2022-0064263, filed on May 25, 2022, the entire disclosure of which is incorporated herein by reference.

BACKGROUND

Field of Invention

Various embodiments of the present disclosure generally relate to an electronic device, and more particularly to a storage device, an electronic device including the storage device, and an operating method thereof.

Description of Related Art

A storage device is a device which stores data under the control of a host device such as a computer or a smartphone. The storage device may include a memory device in which data is stored and a memory controller which controls the memory device, Memory devices may be classified into a volatile memory device and a nonvolatile memory device.

The volatile memory device may be a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when power supply is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a storage device for reducing command latency, an electronic device including the storage device, and an operating method thereof.

An embodiment of the present disclosure may provide for a memory controller. The memory controller may include a plurality of functions configured to be identified as a plurality of storage devices logically separated from each other by an external host, a resource manager configured to store therein a characteristic value and a resource value both corresponding to each of the plurality of functions, and a command processor configured to receive commands respectively corresponding to the plurality of functions from the external host, preferentially process, among the received commands, a command corresponding to a first function having a lowest resource value, among the plurality of functions by referring to the resource values corresponding to the plurality of functions, and update the resource value of the first function by accumulating the characteristic value of the first function in the resource value of the first function.

An embodiment of the present disclosure may provide for a method of operating a memory controller, including a plurality of functions identified as a plurality of storage devices logically separated from each other by an external host. The method may include an operation of receiving commands respectively corresponding to the plurality of functions from the external host, an operation of preferentially processing, among the received commands, a command corresponding to a first function having a lowest resource value, among the plurality of functions by referring to the resource values corresponding to the plurality of functions, and an operation of updating the resource value of the first function by accumulating the characteristic value of the first function in the resource value of the first function.

An embodiment of the present disclosure may provide for a storage device. The storage device may include a memory device including a plurality of memory blocks, and a memory controller, wherein the memory controller may include a plurality of functions configured to be identified as a plurality of storage devices logically separated from each other by an external host, a resource manager configured to store therein a characteristic value and a resource value both corresponding to each of the plurality of functions, and a command processor configured to preferentially process, among received commands respectively corresponding to the plurality of functions and from the external host, a command corresponding to a first function having a lowest resource value, by referring to the resource value corresponding to the plurality of functions and update the resource value of the first function by accumulating the characteristic value of the first function in the resource value of the first function.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in this specification.

Figure 1:
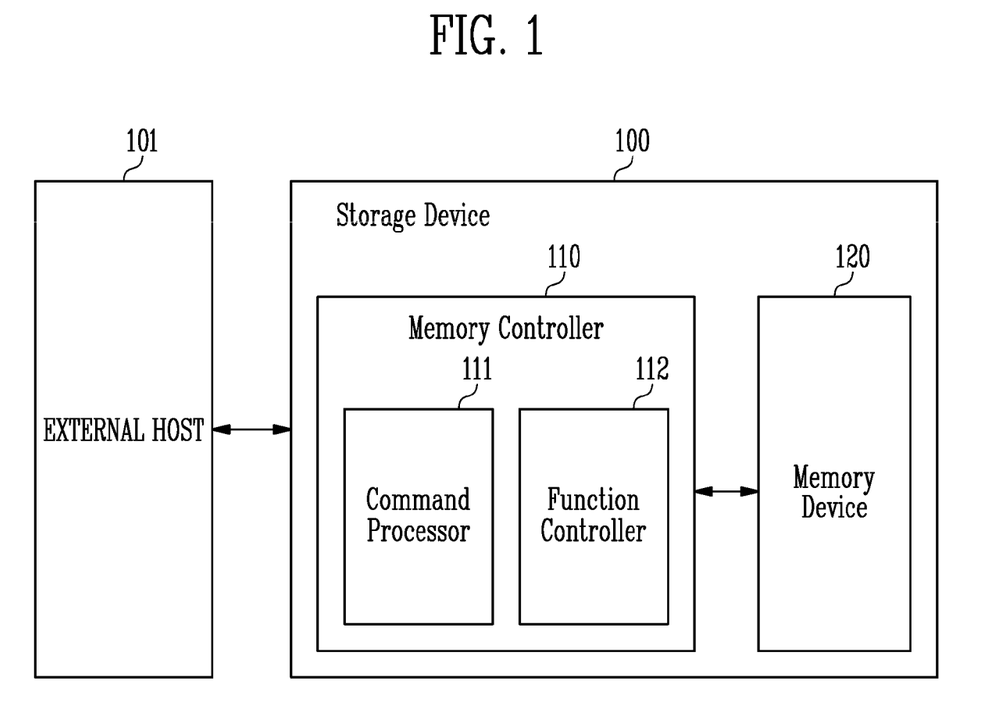
FIG. 1 is a diagram illustrating a storage device according to an embodiment of the present disclosure.

FIG. 1 is a diagram illustrating a storage device 100 according to an embodiment of the present disclosure.

Referring to FIG. 1, the storage device 100 may include a memory controller 110 and a memory device 120. The storage device 100 may be a device which stores data under the control of an external host 101, such as a mobile phone, a smartphone, an MP3 player, a laptop computer, a desktop computer, a game console, a television (TV), a tablet PC, or an in-vehicle infotainment system. Further, the storage device 100 may be a device which stores data under the control of the external host 101, such as a server or a data center, in which large-capacity data is stored in one place.

The storage device 100 may be manufactured as any of various types of storage devices depending on a host interface which is a scheme for communication with the external host 101. For example, the storage device 100 may be implemented as any of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnect (PCI)-card type storage device, a PCI express (PCI-E) card-type storage device, a compact flash (CF) card, a smart media card, and a memory stick.

The storage device 100 may be manufactured in any of various types of package forms. For example, the storage device 100 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 120 may store data. The memory device 120 may be operated under the control of the memory controller 110. The memory device 120 may include a memory cell array (not illustrated) including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array (not illustrated) may include a plurality of memory blocks. Each memory block may include a plurality of memory cells. Each memory block may include a plurality of pages. In an embodiment, a page may be the unit by which data is stored in the memory device 120 or the unit by which data stored in the memory device 120 is read. A memory block may be the unit by which data is erased.

In an embodiment, the memory device 120 may take many alternative forms, such as a double data rate synchronous dynamic random access memory (DDR SDRAM), a low power double data rate fourth generation (LPDDR4) SDRAM, a graphics double data rate (DDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM). For convenience of description, in the present specification, a description is made on that the memory device 120 is a NAND flash memory.

The memory device 120 may receive a command and an address from the memory controller 110, and may access the area of the memory cell array, selected by the address. The memory device 120 may perform an operation indicated by the command on the area selected by the address. For example, the memory device 120 may perform a write operation (i.e., a program operation), a read operation, and an erase operation. During a program operation, the memory device 120 may program data to the area selected by the address. During a read operation, the memory device 120 may read data from the area selected by the address. During an erase operation, the memory device 120 may erase data stored in the area selected by the address.

The memory controller 110 may control the overall operation of the storage device 100.

When power is applied to the storage device 100, the memory controller 110 may run firmware (FW). When the memory device 120 is a flash memory device, the memory controller 110 may run firmware such as a flash translation layer (FTL) for controlling communication between the external host 101 and the memory device 120.

In an embodiment, the memory controller 110 may receive data and a logical block address (LBA) from the external host 101, and may translate the logical block address (LBA) into a physical block address (PBA) indicating the address of memory cells which are included in the memory device 120 and in which the data is to be stored.

The memory controller 110 may control the memory device 100 so that a program operation, a read operation or an erase operation is performed in response to a request received from the external host 101. During a program operation, the memory controller 110 may provide a program command, a physical block address, and data to the memory device 120. During a read operation, the memory controller 110 may provide a read command and a physical block address to the memory device 120. During an erase operation, the memory controller 110 may provide an erase command and a physical block address to the memory device 120.

In an embodiment, the memory controller 110 may internally generate a command, an address, and data regardless of whether a request from the external host 101 is received, and may transmit them to the memory device 120. For example, the memory controller 110 may provide the memory device 120 with commands, addresses, and data required in order to perform a program operation, a read operation, and an erase operation that are involved in performing wear leveling, read reclaim, garbage collection, etc.

In an embodiment, the memory controller 110 may control two or more memory devices 120. In this case, the memory controller 110 may control the memory devices 120 depending on an interleaving scheme to improve operating performance. The interleaving scheme may be a scheme for controlling the memory devices 120 so that the operations of at least two memory devices 100 overlap each other.

The external host 101 may communicate with the storage device 100 using at least one of various communication standards or interfaces such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

In the present specification, although the storage device 100 and the external host 101 are described as performing data communication based on a UFS communication interface for convenience of description, embodiments of the present disclosure are not limited to data communication based on the UFS communication interface. In detail, the storage device 100 and the external host 101 may perform data communication using a command defined as a protocol information unit (hereinafter referred to as "PIU"). A PIU may be a type of data packet generated according to a predefined rule.

A PIU may be a command for allowing the external host 101 or the storage device 100 to request or instruct performance of a certain operation, or respond to the request or instruction. In an embodiment, various PIUs may be defined depending on the usage and purpose thereof. For example, a PIU may be one of a query request PIU, a command PIU, a response PIU, a data out PIU, a data in PIU, and a ready to transfer PIU.

In an embodiment, the query request PIU may include a device descriptor for providing various parameters of the storage device 100, The device descriptor may include information indicating whether the storage device 100 is the storage device 100 supporting an advanced replay protection memory block (RPMB) mode.

The smallest size of a PIU may be 32 bytes, and the maximum size of a PIU may be 65600 bytes. The format of a PIU may have different sizes depending on the type thereof.

The memory controller 110 may include a command processor 111 and a function controller 112, The command processor 111 may couple the external host 101 to the function controller 112 by performing communication with the external host 101. The function controller 112 may control at least one memory block included in the memory device 120 in response to the command received from the external host 101. The configuration and operation of the command processor 111 and the function controller 112 will be described in detail below with reference to FIGS. 2 and 5.

Figure 2:
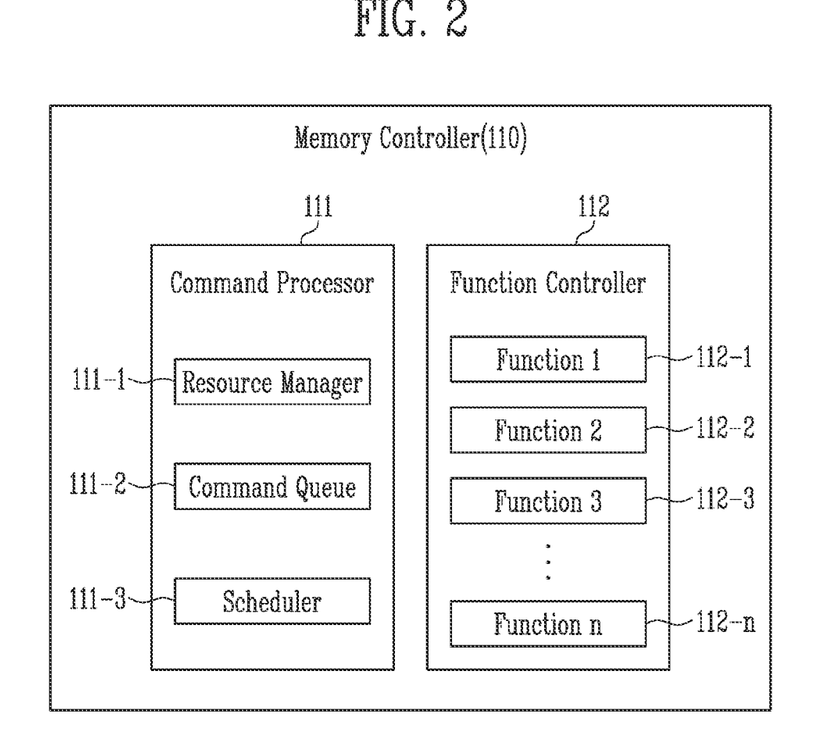
FIG. 2 is a diagram illustrating a memory controller of FIG. 1 according to an embodiment of the present disclosure.

FIG. 2 is a diagram illustrating the memory controller 110 of FIG. 1 according to an embodiment of the present disclosure.

Referring to FIG. 2, the memory controller 110 may include a command processor 111 and a function controller 112. The command processor 111 and the function controller 112 may be electrically connected to each other.

The command processor 111 may include a resource manager 111-1, a command queue 111-2, and a scheduler 111-3, A hardware configuration included in the command processor 111 is not limited to that illustrated in FIG. 2, In an example, the resource manager 1114 and the scheduler 111-3 may be integrated into a single module which manages a resource value and manages the order of execution of commands. In an example, the scheduler 111-3 may denote a command queue manager.

In an example, the resource value may be an accumulated value for the characteristic value of a function. For example, the resource value of a first function may be a value accumulated by the characteristic value of the first function whenever a command corresponding to the first function is processed.

The function controller 112 may include a plurality of functions including a first function 112-1, a second function 112-2, a third function 112-3, an n-th function 112-n. In the present disclosure, the term "function" may be a "physical function" or "PF". The plurality of functions included in the function controller 112 may be identified as a plurality of storage devices logically separated from each other by the external host 101. That is, the plurality of functions may be different storage devices with respect to the external host 101.

The resource manager 111-1 may store characteristic values and resource values respectively corresponding to the plurality of functions 112-1 to 112-n. In an example, the plurality of functions 112-1 to 112-n may have different characteristic values. For example, the characteristic value of the first function 112-1 may be 50, the characteristic value of the second function 112-2 may be 100, and the characteristic value of the third function 112-3 may be 120.

In an example, the characteristic values of the plurality of functions 112-1 to 112-n may be determined based on the average amounts of data respectively processed by the functions 112-1 to 112-n and respective weights of the functions 112-1 to 112-n. The respective weights of the plurality of functions 112-1 to 112-n may be determined based on the types of commands received from an external host (e.g., the external host 101 of FIG. 1). In an example, the commands received by the plurality of functions 112-1 to 112-n from the external host may include a program command, a read command, or an erase command.

In an example, the memory controller 110 may adjust the occupation percentages of the plurality of functions 112-1 to 112-n by adjusting respective characteristic values of the plurality of functions 112-1 to 112-n.

In an example, the resource values of the plurality of functions 112-1 to 112-n may be initialized when the storage device (e.g., the storage device 100 of FIG. 1) boots. For example, when the storage device boots in the case in which the resource value of the first function 112-1 is 250 and the resource value of the second function 112-2 is 300, the resource value of the first function 112-1 and the second function 112-2 may be initialized to 0.

When the command processor 111 receives commands from the external host (e.g., the external host 101 of FIG. 1), the command queue 111-2 may sequentially store the commands in the order in which the command processor 111 receives the commands. For example, when the command processor 111 sequentially receives a program command, a read command, and a read command from the external host, the command queue 111-2 may sequentially store the program command, the read command, and the read command.

The external host 101 may include a plurality of hosts. In an example, a plurality of commands received from the plurality of hosts may be stored in the command queue 111-2 in the order in which the command processor 111 receives the commands. For example, when the command processor 111 receives a first command from a first host and thereafter receives a second command from a second host, the command queue 111-2 may sequentially store the first command and the second command.

The scheduler 111-3 may determine whether to execute the plurality of commands stored in the command queue 111-2. In an example, the scheduler 111-3 may determine which function is to execute each command stored in the command queue 111-2 based on the characteristic values and resource values of the plurality of functions 112-1 to 112-n stored in the resource manager 111-1. For example, the scheduler 111-3 may determine that the function 112-1 is to execute the program command, which is the command first stored in the command queue 111-2, based on the characteristic values and resource values of the plurality of functions 112-1 to 112-n. A detailed operation in which the scheduler 111-3 determines the function to execute each command will be described later with reference to FIG. 5.

Figure 3:
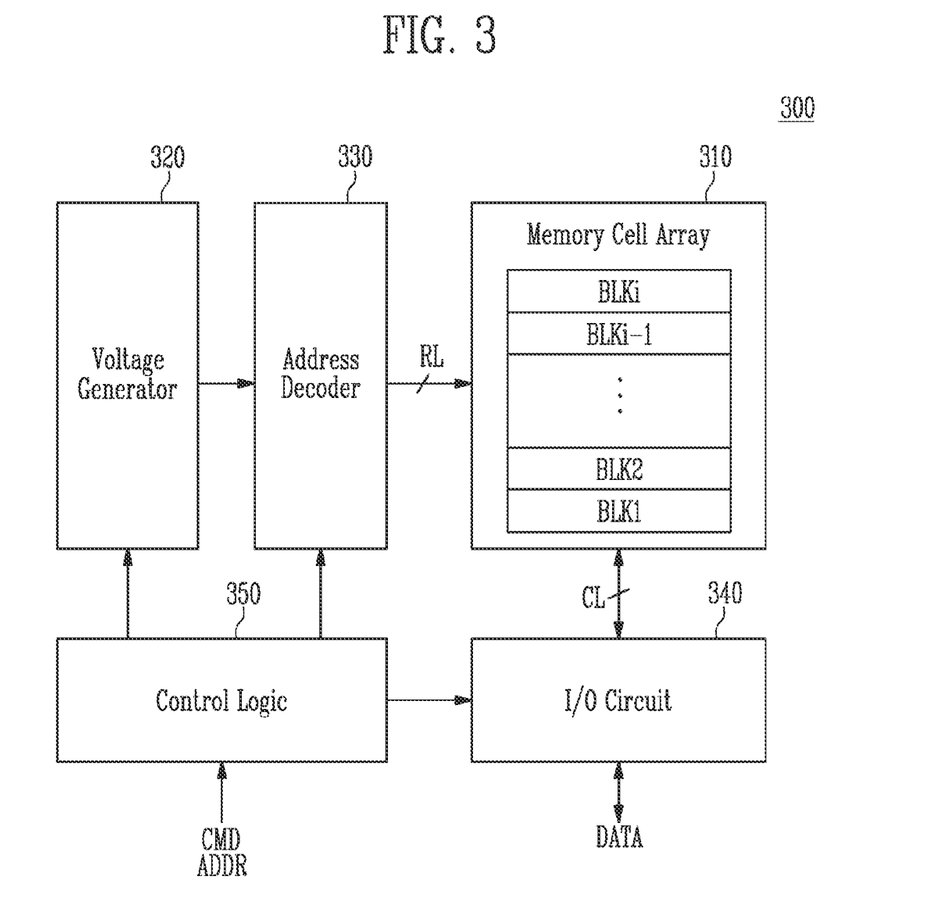
FIG. 3 is a diagram illustrating a memory device according to an embodiment of the present disclosure.

FIG. 3 is a diagram illustrating a memory device 300 according to an embodiment of the present disclosure. Although the memory device 300 of FIG. 3 is indicated by another reference numeral for convenience of description, it may be understood that the memory device 300 is the same component as the memory device 120 of FIG. 1.

Referring to FIG. 3, the memory device 300 may include a memory cell array 310, a voltage generator 320, an address decoder 330, an input/output (I/O) circuit 340, and a control logic 350.

The memory cell array 310 includes a plurality of memory blocks BLK1 to BLKi. The plurality of memory blocks BLK1 to BLKi may be coupled to the address decoder 330 through row lines RL. The plurality of memory blocks BLK1 to BLKi may be coupled to the input/output (I/O) circuit 340 through column lines CL. In an embodiment, the row lines RL may include word lines, source select lines, and drain select lines. In an embodiment, the column lines CL may include bit lines.

Each of the memory blocks BLK1 to BLKi includes a plurality of memory cells. In an embodiment, the plurality of memory cells may be nonvolatile memory cells. Memory cells coupled to the same word line, among the plurality of memory cells, may be defined as one physical page. That is, the memory cell array 310 may include a plurality of physical pages. Each of the memory cells of the memory device 300 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

In an embodiment, the voltage generator 320, the address decoder 330, and the I/O circuit 340 may be collectively designated as a peripheral circuit. The peripheral circuit may drive the memory cell array 310 under the control of the control logic 350. The peripheral circuit may drive the memory cell array 310 to perform a program operation, a read operation, and an erase operation.

The voltage generator 320 may generate a plurality of operating voltages using an external supply voltage provided to the memory device 300. The voltage generator 320 may be operated under the control of the control logic 350.

In an embodiment, the voltage generator 320 may generate an internal supply voltage by regulating the external supply voltage. The internal supply voltage generated by the voltage generator 320 may be used as an operating voltage for the memory device 300.

In an embodiment, the voltage generator 320 may generate the plurality of operating voltages using the external supply voltage or the internal supply voltage. The voltage generator 320 may generate various voltages required by the memory device 300. For example, the voltage generator 320 may generate a plurality of erase voltages, a plurality of program voltages, a plurality of pass voltages, a plurality of select read voltages, and a plurality of unselect read voltages.

The voltage generator 320 may include a plurality of pumping capacitors for receiving the internal supply voltage to generate a plurality of operating voltages having various voltage levels, and may generate the plurality of operating voltages by selectively enabling the plurality of pumping capacitors under the control of the control logic 350.

The generated operating voltages may be supplied to the memory cell array 310 by the address decoder 330.

The address decoder 330 is coupled to the memory cell array 310 through the row lines RL. The address decoder 330 may be operated under the control of the control logic 350. The address decoder 330 may receive addresses ADDR from the control logic 350. The address decoder 330 may decode a block address, among the received addresses ADDR. The address decoder 330 may select at least one of the memory blocks BLK1 to BLKi according to the decoded block address. The address decoder 330 may decode a row address, among the received addresses ADDR. The address decoder 330 may select at least one of word lines of the selected memory block according to the decoded row address. In an embodiment, the address decoder 330 may decode a column address, among the received addresses ADDR. The address decoder 330 may couple the I/O circuit 340 to the memory cell array 310 according to the decoded column address.

In an embodiment, the address decoder 330 may include components such as a row decoder, a column decoder, and an address buffer.

The I/O circuit 340 may include a plurality of page buffers. The plurality of page buffers may be coupled to the memory cell array 310 through the bit lines. During a program operation, data may be stored in selected memory cells based on the data stored in the plurality of page buffers.

During a read operation, the data stored in the selected memory cells may be sensed through bit lines, and the sensed data may be stored in the page buffers.

The control logic 350 may control the address decoder 330, the voltage generator 320, and the I/O circuit 340. The control logic 350 may be operated in response to a command CMD transferred from an external device. The control logic 350 may control the peripheral circuit by generating control signals in response to the command CMD and the addresses ADDR.

Figure 4:
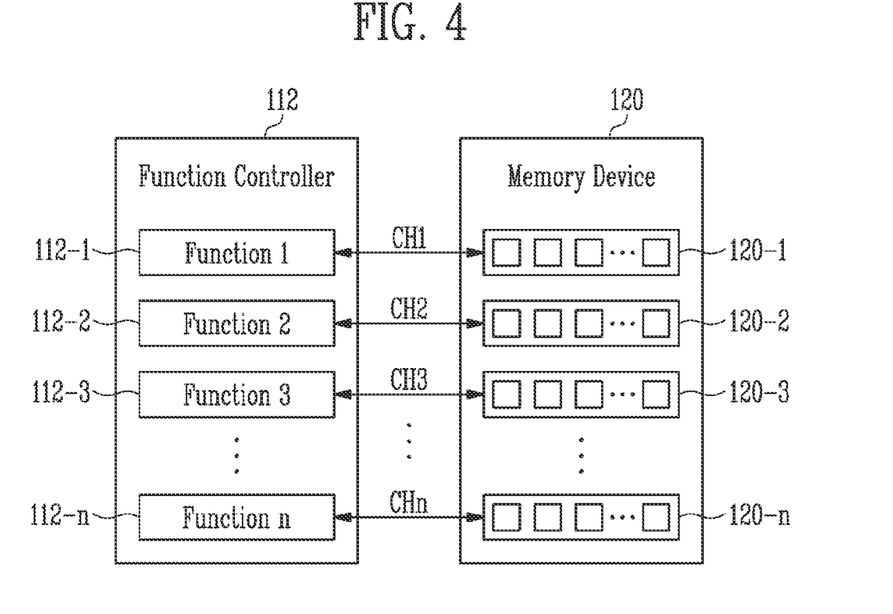
FIG. 4 is a diagram illustrating a connection relationship between a function controller and a memory device according to an embodiment of the present disclosure.

FIG. 4 is a diagram illustrating a connection relationship between a function controller 112 and a memory device 120 according to an embodiment of the present disclosure.

Referring to FIG. 4, a plurality of functions 112-1 to 112-$n$ included in the function controller 112 may form different channels with a plurality of memory blocks 120-1 to 120-$n$ included in the memory device 120.

The plurality of functions 112-1 to 112-$n$ may form a one-to-one (1:1) correspondence relationship with the plurality of memory blocks 120-1 to 120-$n$. That is, the plurality of functions 112-1 to 112-$n$ may control the plurality of memory blocks 120-1 to 120-$n$, respectively. For example, the first function 112-1 may form a first channel CH1 with the first memory block 120-1, the second function 112-2 may form a second channel CH2 with the second memory block 120-2, and the n-th function 112-$n$ may form an n-th channel CHn with the n-th memory block 120-$n$. The channels CH1 to CHn may refer to interfaces or protocols required in order for the functions and the memory blocks to communicate with each other.

In an embodiment (not illustrated), the plurality of functions 112-1 to 112-$n$ may form an n-to-one (n:1) correspondence relationship with the plurality of memory blocks 120-1 to 120-$n$. That is, two or more of the plurality of functions 112-1 to 112-$n$ may control one of the plurality of memory blocks 120-1 to 120-$n$.

Figure 5:
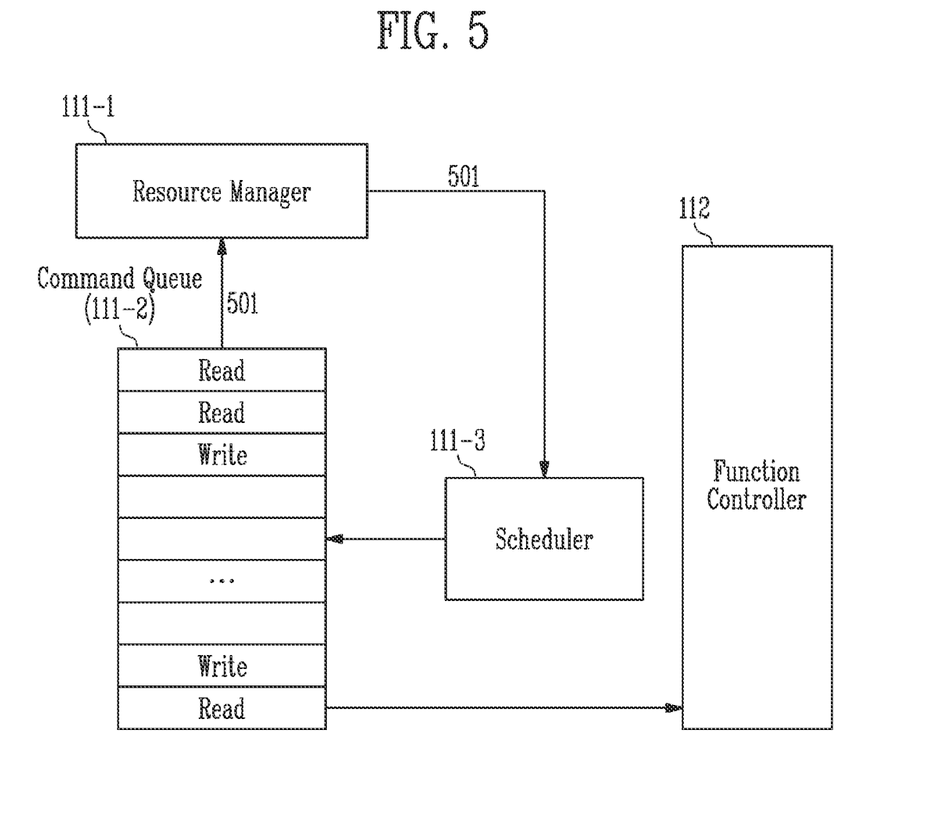
FIG. 5 is a diagram illustrating the operation of a memory controller according to an embodiment of the present disclosure.

FIG. 5 is a diagram illustrating the operation of the memory controller 110 according to an embodiment of the present disclosure.

Referring to FIG. 5, a scheduler 111-3 may control a function controller 112 based on information about commands and information (e.g., characteristic values and resource values) about a plurality of functions (e.g., the plurality of functions 112-1 to 112-$n$ of FIG. 4), which are received from a resource manager 111-1.

In an example, the resource manager 111-1 may receive information about commands from a command queue 111-2, The information about the commands may include information about the command to be currently output (or to be processed), among a plurality of commands sequentially stored in the command queue 111-2. Whenever each command is executed, the resource manager 111-1 may receive information about the corresponding command from the command queue 111-2. In an example, the resource manager 111-1 may receive information about commands from the command queue 111-2 regardless of whether each command is executed.

The resource manager 111-1 may store characteristic values and resource values respectively corresponding to the plurality of functions (e.g., the plurality of functions 112-1 to 112-n of FIG. 4) included in the function controller 112, In an example, the characteristic values of the plurality of functions (e.g., the plurality of functions 112-1 to 112-n of FIG. 4) may be different from each other. The resource values of the plurality of functions (e.g., the plurality of functions 112-1 to 112-n of FIG. 4) may be updated as each command is executed.

The scheduler 111-3 may receive the information about commands and the characteristic values and resource values respectively corresponding to the plurality of functions (e.g., the plurality of functions 112-1 to 112-n of FIG. 4) from the resource manager 111-1. The scheduler 111-3 may receive information about commands, characteristic values and resource values respectively corresponding to the plurality of functions (e.g., the plurality of functions 112-1 to 112-n of FIG. 4) from the resource manager 111-1 whenever each command is executed. In an example, the scheduler 111-3 may receive information about commands, characteristic values and resource values respectively corresponding to the plurality of functions (e.g., the plurality of functions 112-1 to 112-n of FIG. 4) from the resource manager 111-1 regardless of whenever each command is executed.

The scheduler 111-3 may preferentially process a command corresponding to a function having the lowest resource value, among the plurality of functions (e.g., the plurality of functions 112-1 to 112-n of FIG. 4), based on the resource values respectively corresponding to the plurality of functions (e.g., the plurality of functions 112-1 to 112-n of FIG. 4). For example, in the case in which the third function 112-3, among the plurality of functions (e.g., the plurality of functions 112-1 to 112-n of FIG. 4), has a resource value corresponding to the lowest value, e.g., 250, a command (e.g., a program command) corresponding to the third function 112-3 may be preferentially processed.

In an example, when resource values respectively corresponding to the plurality of functions 112-1 to 112-n are identical to each other, a command corresponding to a function having the lowest characteristic value, among the plurality of functions 112-1 to 112-n, may be preferentially processed. In an example, when all of the plurality of functions 112-1 to 112-n have a resource value of 0, a command corresponding to a function having the lowest characteristic value, among the plurality of functions 112-1 to 112-n, may be preferentially processed. In this way, resources that are used by the plurality of functions 112-1 to 112-n may be minimized.

In the case in which a command corresponding to one of the plurality of functions (e.g., the plurality of functions 112-1 to 112-n of FIG. 4) is determined to be preferentially processed based on the resource values respectively corresponding to the plurality of functions (e.g., the plurality of functions 112-1 to 112-n of FIG. 4), the scheduler 111-3 may control the command queue 111-2 so that the command queue 111-2 outputs the corresponding command to the function controller 112. In an example, the command queue 111-2 may output the command to the function controller 112 under the control of the scheduler 111-3.

When the command corresponding to the function having the lowest resource value is preferentially processed, the resource manager 111-1 may update the resource value of the function by reflecting the characteristic value of the function having the lowest resource value in the resource value. In an example, in the case in which the function having the lowest resource value is the fifth function 112-5 and a command corresponding to the fifth function 112-5 is output to the memory device 120, the resource manager 111-1 may update the resource values respectively corresponding to the plurality of functions 112-1 to 112-n by reflecting the characteristic value of the fifth function 112-5 in the resource value of the fifth function 112-5.

Figure 6:
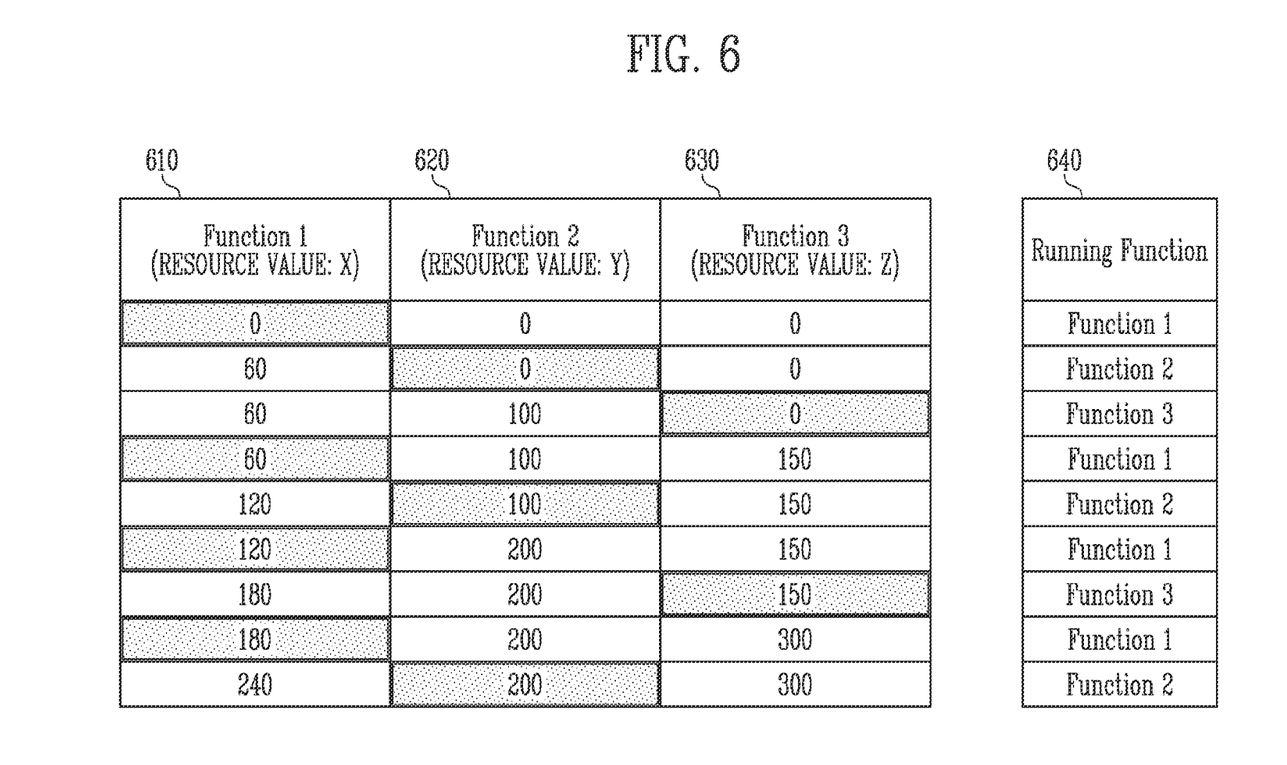
FIG. 6 is a diagram illustrating the operation of the memory controller of FIG. 5 according to an embodiment of the present disclosure.

FIG. 6 is a diagram illustrating the operation of the memory controller of FIG. 5 according to an embodiment of the present disclosure.

Referring to FIG. 6, a running function of processing commands depending on resource values respectively corresponding to the plurality of functions 112-1 to 112-n may be determined. Hereinafter; a description will be made based on a table 610 related to a resource value of a first function, a table 620 related to a resource value of a second function, and a table 630 related to a resource value of a third function, and a table 640 related to the running function, Although only the table 610 related to the resource value of the first function, the table 620 related to the resource value of the second function, and the table 630 related to the resource value of the third function are illustrated in FIG. 6 for convenience of description, the description may be equally applied to functions included in the plurality of functions 112-1 to 112-n.

In an embodiment, when all of the resource value of the first function, the resource value of the second function, and the resource value of the third function are 0, a command corresponding to a function having the lowest characteristic value, among the first to third functions, may be preferentially processed. For example, when all of the resource value of the first function, the resource value of the second function, and the resource value of the third function are 0 in the case where the characteristic value x of the first function is 60, the characteristic value y of the second function is 100, and the characteristic value z of the third function is 150, the command corresponding to the first function may be preferentially processed.

In an embodiment, when the command corresponding to the first function is preferentially processed, the characteristic value x of the first function is reflected in the resource value of the first function, and thus the resource value of the first function may be updated from 0 to x. The resource value of the second function and the third function may be maintained at 0.

In an embodiment, in the case where the resource value of the first function is x, the resource value of the second function is 0, and the resource value of the third function is 0, a command corresponding to a function having a lower characteristic value between the second and third functions may be preferentially processed. For example, when the resource value of the first function is x, the resource value of the second function is 0, and the resource value of the third function is 0 in the case where the characteristic value y of the second function is 100 and the characteristic value z of the third function is 150, a command corresponding to the second function may be preferentially processed.

In an embodiment, when the command corresponding to the second function is preferentially processed, the characteristic value y of the second function is reflected in the resource value of the second function, and thus the resource value of the second function may be updated from 0 to y. The resource values of the first function and the third function may be maintained at x and 0, respectively.

In an embodiment, in the case where the resource value of the first function is x, the resource value of the second function is y, and the resource value of the third function is 0, a command corresponding to the third function having the lowest resource value may be preferentially processed. In an example, in the case where the resource value of the first function is 60, the resource value of the second function is 100, and the resource value of the third function is 0, a command corresponding to is the third function may be preferentially processed.

In an embodiment, when the command corresponding to the third function is preferentially processed, the characteristic value z of the third function is reflected in the resource value of the third function, and thus the resource value of the third function may be updated from 0 to z. The resource values of the first function and the second function nay be maintained at x and y, respectively.

In an embodiment, when the resource value of the first function is x, the resource value of the second function is y, and the resource value of the third function is z, a command corresponding to a function having the lowest resource value, among the first to third functions, may be preferentially processed. In an example, when the resource value of the first function is 60, the resource value of the second function is 100, and the resource value of the third function is 150, a command corresponding to the first function having the lowest resource value, among the first to third functions, may be preferentially processed.

In an embodiment, when the command corresponding to the first function is preferentially processed, the characteristic value x of the first function is reflected in the resource value of the first function, and thus the resource value of the first function may be updated from x to 2x. The resource values of the second function and the third function may be maintained at y and z, respectively.

In an embodiment, when the resource value of the first function is 3x, the resource value of the second function is 2y, and the resource value of the third function is z, a command corresponding to a function having the lowest resource value, among the first to third functions, may be preferentially processed. In an example, in the case where the resource value of the first function is 180, the resource value of the second function is 200, and the resource value of the third function is 150, a command corresponding to the third function having the lowest resource value, among the first to third functions, may be preferentially processed.

In an embodiment, when the command corresponding to the third function is preferentially processed, the characteristic value z of the third function is reflected in the resource value of the third function, and thus the resource value of the third function may be updated from z to 2z. The resource values of the first function and the second function may be maintained at 3x and 2y.

Figure 7:
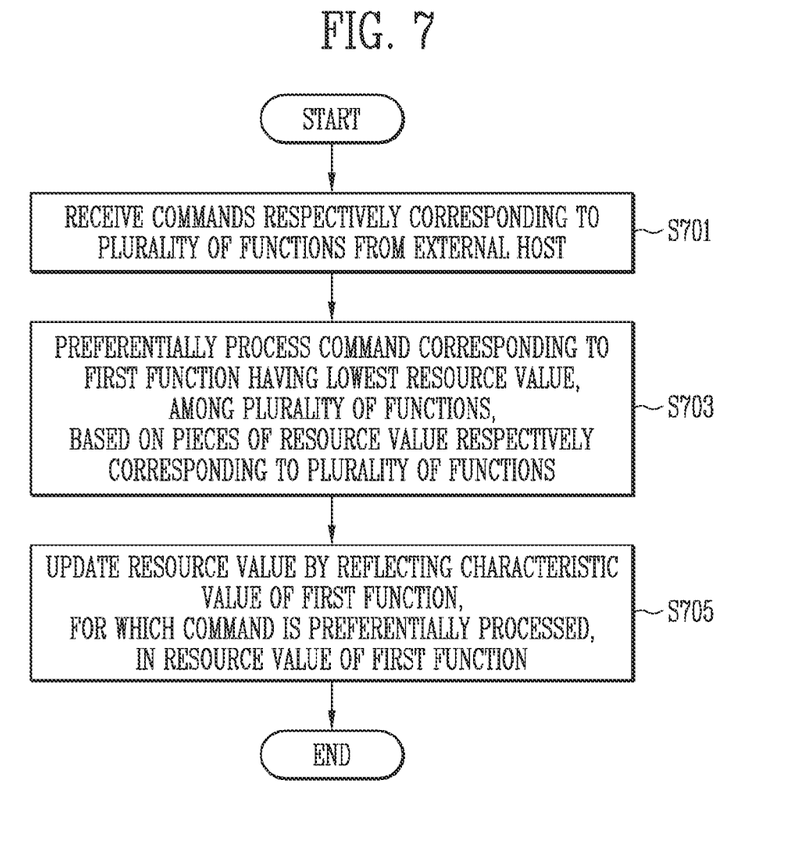
FIG. 7 is an operation flowchart of the memory controller according to an embodiment of the present disclosure.

FIG. 7 is an operation flowchart of the memory controller 110 according to an embodiment of the present disclosure.

Referring to FIG. 7, the memory controller 110 may process commands based on information (e.g., characteristic values or resource values) related to functions. The operation of the memory controller 110 illustrated in FIG. 7 may be described in detail with reference to FIG. 2.

In operation S701, the memory controller 110 may receive commands respectively corresponding to a plurality of functions 112-1 to 112-n from the external host 101. The commands respectively corresponding to the plurality of functions 112-1 to 112-n may include a program command, a read command, and an erase command.

In operation S703, the memory controller 110 may preferentially process a command (e.g., a program command) corresponding to a first function (e.g., 112-1) having the lowest resource value, among the plurality of functions 112-1 to 112-n, based on resource values respectively corresponding to the plurality of functions 112-1 to 112-n. In an example, when the resource values respectively corresponding to the plurality of functions 112-1 to 112-n are identical to each other, a command corresponding to a function having the lowest characteristic value, among characteristic values respectively corresponding to the plurality of functions 112-1 to 112-n, may be preferentially processed.

In operation S705, the memory controller 110 may update the resource value of the first function by reflecting the characteristic value of the first function (e.g., 112-1), for which the command is preferentially processed, in the resource value of the first function (e.g., 112-1). In an example, the resource value of the first function may be a resource value in which the characteristic value of the first function is added to previous resource value.

In accordance with the present disclosure, there are provided a storage device for reducing command latency, an electronic device including the storage device, and an operating method thereof.

The present disclosure described above is not limited by the aforementioned embodiments and the accompanying drawings, and it will be apparent to those skilled in the art to which the present disclosure pertains that various replacements, modifications, and changes can be made without departing from the technical spirit of the present disclosure and the following claims. Furthermore, the embodiments may be combined to form additional embodiments.

What is claimed is:

1. A memory controller comprising:
a plurality of functions, each function of the plurality of functions being configured to be identified, from a perspective of an external host, as one of a plurality of storage devices logically separated from each other;
a resource manager configured to store, for each function of the plurality of functions, both a characteristic value and a resource value associated with each function of the plurality of functions; and
a command processor configured to receive commands respectively directed to each function of the plurality of functions from the external host, preferentially process, among the received commands, a command directed to a first function of the plurality of functions having a lowest resource value by referring to the resource value stored by the resource manager associated with each function of the plurality of functions, and update the resource value associated with the first function by adding the characteristic value associated with the first function to the resource value of the resource manager associated with the first function,
wherein the characteristic value is determined based on both an average amount of data processed by each function of the plurality of functions and a weight, which is determined based on types of the commands, associated with each function of the plurality of functions, and
wherein the resource value corresponds to a value accumulated by the characteristic value of each function of the plurality of functions whenever a command associated with each function of the plurality of functions is processed.

2. The memory controller according to claim 1, wherein the plurality of functions have different characteristic values.

3. The memory controller according to claim 1, wherein the resource values are initialized when the storage device boots.

4. The memory controller according to claim 1, wherein the plurality of functions control different memory blocks among a plurality of memory blocks included in a memory device.

5. The memory controller according to claim 1, wherein:
the external host comprises a plurality of hosts,
the command processor comprises a command queue, and
a plurality of commands received from the plurality of hosts are stored in the command queue in an order in which the command processor receives the plurality of commands.

6. The memory controller according to claim 1, wherein the commands include a program command, a read command, or an erase command.

7. The memory controller according to claim 1, wherein the command processor performs communication with the external host using a protocol information unit (PIU) or a protocol data unit (PDU).

8. The memory controller according to claim 1, wherein occupation percentages of the plurality of functions are adjusted by adjusting the characteristic values.

9. A method of operating a memory controller including a plurality of functions, each function of the plurality of functions being identified, from a perspective of an external host, as one of a plurality of storage devices logically separated from each other, the method comprising:
an operation of storing, for each function of the plurality of functions, both a characteristic value and a resource value associated with each function of the plurality of functions;
an operation of receiving commands from the external host respectively directed to the plurality of functions;
an operation of preferentially processing, among the received commands, a command directed to a first function of the plurality of functions having a lowest resource value by referring to the resource value associated with each function of the plurality of functions; and
an operation of updating the resource value associated with the first function by adding the characteristic value associated with the first function to the resource value associated with the first function,
wherein the characteristic value is determined based on both an average amount of data processed by each function of the plurality of functions and a weight, which is determined based on types of the commands, associated with each function of the plurality of functions, and
wherein the resource value corresponds to a value accumulated by the characteristic value of each function of the plurality of functions whenever a command associated with each function of the plurality of functions is processed.

10. The method according to claim 9, wherein the plurality of functions have different characteristic values.

11. The method according to claim 9, wherein the resource values are initialized when the storage device boots.

12. The method according to claim 9, wherein the plurality of functions control different memory blocks, among a plurality of memory blocks included in a memory device.

13. The method according to claim 9, wherein the commands include a program command, a read command or an erase command.

14. A storage device comprising:
a memory device including a plurality of memory blocks; and
a memory controller comprising:
a plurality of functions, each function of the plurality of functions being configured to be identified, from a perspective of an external host, as one of a plurality of storage devices logically separated from each other;
a resource manager configured to store, for each function of the plurality of functions, both a characteristic value and a resource value both associated with each function of the plurality of functions; and
a command processor configured to preferentially process, among received commands respectively directed to each function of the plurality of functions and from the external host, a command directed to a first function of the plurality of functions having a lowest resource value by referring to the resource value stored by the resource manager associated with each function of the plurality of functions, and
update the resource value associated with the first function by adding the characteristic value associated with the first function to the resource value of the resource manager associated with the first function,
wherein the characteristic value is determined based on both an average amount of data processed by each function of the plurality of functions and a weight, which is determined based on types of the commands, associated with each function of the plurality of functions, and
wherein the resource value corresponds to a value accumulated by the characteristic value of each function of the plurality of functions whenever a command associated with each function of the plurality of functions is processed.

15. The storage device according to claim 14, wherein the plurality of functions include different characteristic values.

16. The storage device according to claim 14, wherein the resource values are initialized when the storage device boots.

17. The storage device according to claim 14, wherein the plurality of functions control different memory blocks among the plurality of memory blocks included in the memory device.

18. The storage device according to claim 14, wherein:
the external host comprises a plurality of hosts,
the command processor comprises a command queue, and
a plurality of commands received from the plurality of hosts are stored in the command queue in an order in which the command processor receives the plurality of commands.

* * * * *